US 007723251B2

(12) United States Patent
Hartenstein et al.

(10) Patent No.: US 7,723,251 B2
(45) Date of Patent: May 25, 2010

(54) METHOD OF REGENERATION OF SCR CATALYST

(75) Inventors: Hans-Ulrich Hartenstein, Cramerton, NC (US); Thies Hoffmann, Lake Wylie, SC (US)

(73) Assignee: Evonik Energy Services LLC, Kings Mountain, NC (US)

( * ) Notice: Subject to any disclaimer, the term of this patent is extended or adjusted under 35 U.S.C. 154(b) by 0 days.

(21) Appl. No.: 12/287,347

(22) Filed: Oct. 8, 2008

(65) Prior Publication Data

US 2009/0233786 A1 Sep. 17, 2009

Related U.S. Application Data

(60) Provisional application No. 61/068,989, filed on Mar. 11, 2008.

(51) Int. Cl.
*B01J 38/64* (2006.01)
*B01J 38/48* (2006.01)
*B01J 38/60* (2006.01)
*B01J 38/62* (2006.01)
*B01J 38/02* (2006.01)
*B08B 3/12* (2006.01)
*B08B 3/00* (2006.01)

(52) U.S. Cl. ............... 502/25; 502/22; 502/27; 502/28; 502/56; 134/1; 134/28; 134/29

(58) Field of Classification Search ............ None
See application file for complete search history.

(56) References Cited

U.S. PATENT DOCUMENTS

| 3,674,707 A | 7/1972 | Pieters et al. ............ 502/26 |
| 4,407,733 A | 10/1983 | Birkenstock et al. ........ 502/174 |
| 4,615,991 A | 10/1986 | Obayashi et al. ............. 502/28 |
| 4,656,147 A | 4/1987 | Iida et al. ...................... 502/26 |
| 5,120,690 A | 6/1992 | Jung et al. ................. 501/155 |
| 5,151,256 A | 9/1992 | Kato et al. ................... 423/210 |
| 5,283,052 A | 2/1994 | Hums ......................... 422/223 |
| 5,394,610 A | 3/1995 | Stoephasius et al. .......... 29/890 |
| 5,522,941 A | 6/1996 | Uchinami et al. ............. 134/37 |
| 5,571,771 A | 11/1996 | Abel et al. .................. 502/330 |
| 5,785,937 A | 7/1998 | Neufert et al. ............ 423/213.2 |

(Continued)

FOREIGN PATENT DOCUMENTS

CA 2336562 1/2000

(Continued)

OTHER PUBLICATIONS

Wypych, George Knovel Solvents—A Properties Database. Acetic Acid. ChemTec Publishing. copyright 2008. Online version available at: http://knovel.com/web/portal/browse/display?_EXT_KNOVEL_DISPLAY_bookid=635&VerticalID=0.*

(Continued)

*Primary Examiner*—Melvin C Mayes
*Assistant Examiner*—Sarah Van Oudenaren
(74) *Attorney, Agent, or Firm*—K&L Gates LLP

(57) ABSTRACT

A method of regeneration of a SCR catalyst for use in a power plant facility burning fossil fuels, bio-based fuels, or a combination thereof, wherein poisons are removed from the catalyst. The method is suitable for use during neutralization using $C_1$ to $C_8$ carboxylic acids.

11 Claims, 1 Drawing Sheet

U.S. PATENT DOCUMENTS

| | | | | |
|---|---|---|---|---|
| 5,820,693 | A | 10/1998 | Patchett et al. | 134/22.12 |
| 5,869,419 | A | 2/1999 | Obayashi et al. | 502/305 |
| 5,873,329 | A | 2/1999 | Heering et al. | 122/7 R |
| 5,882,422 | A | 3/1999 | Obayashi et al. | 134/1 |
| 5,953,911 | A | 9/1999 | Guth et al. | 60/295 |
| 6,025,292 | A | 2/2000 | Obayashi et al. | 502/27 |
| 6,080,696 | A | 6/2000 | Duke et al. | 502/27 |
| 6,136,222 | A | 10/2000 | Friesen et al. | 252/184 |
| 6,232,254 | B1 | 5/2001 | Schneider et al. | 502/22 |
| 6,241,286 | B1 | 6/2001 | Ogura et al. | 281/29 |
| 6,241,826 | B1 | 6/2001 | Dittmer et al. | 134/1 |
| 6,299,695 | B1 | 10/2001 | Gilgen | 134/1 |
| 6,387,836 | B1 | 5/2002 | Dorr et al. | 502/22 |
| 6,395,665 | B2 | 5/2002 | Nojima et al. | 502/25 |
| 6,455,456 | B1 | 9/2002 | Spokoyny | 502/20 |
| 6,482,762 | B1 | 11/2002 | Ruffin et al. | 502/33 |
| 6,484,733 | B2 | 11/2002 | Budin et al. | 134/22.19 |
| 6,576,585 | B2 | 6/2003 | Fischer et al. | 502/309 |
| 6,596,661 | B2 | 7/2003 | Neufert | 502/28 |
| 6,631,727 | B2 | 10/2003 | Schneider et al. | 134/110 |
| 6,641,785 | B1 | 11/2003 | Neufert et al. | 422/177 |
| 6,913,026 | B2 | 7/2005 | Winnestaffer et al. | 134/22.18 |
| 6,929,701 | B1 | 8/2005 | Patel et al. | 134/1 |
| 7,384,882 | B2 | 6/2008 | Sun et al. | 502/27 |
| 7,569,506 | B2 | 8/2009 | Foerster | 502/27 |
| 2001/0006929 | A1 | 7/2001 | Budin et al. | 502/24 |
| 2002/0006860 | A1 | 1/2002 | Schneider et al. | 502/22 |
| 2004/0137209 | A1 | 7/2004 | Zeller et al. | 428/304.4 |
| 2004/0163676 | A1 | 8/2004 | Winnestaffer et al. | 134/17 |
| 2005/0119109 | A1 | 6/2005 | Schneider et al. | 502/22 |
| 2006/0060219 | A1 | 3/2006 | Rabitsch et al. | 134/22.11 |
| 2006/0094587 | A1 | 5/2006 | Lee et al. | 502/27 |
| 2006/0135347 | A1 | 6/2006 | Schluttig et al. | 502/25 |
| 2006/0148639 | A1 | 7/2006 | Foerster | 502/27 |
| 2007/0032373 | A1 | 2/2007 | Matsumoto et al. | 502/20 |
| 2007/0161509 | A1 | 7/2007 | Blohm et al. | 705/37 |
| 2008/0115800 | A1 | 5/2008 | Blohm | 134/1 |

FOREIGN PATENT DOCUMENTS

| | | |
|---|---|---|
| DE | 38 10 137 A1 | 10/1989 |
| DE | 38 16 600 A1 | 11/1989 |
| DE | 40 13 720 | 10/1991 |
| DE | 42 17 738 | 12/1993 |
| DE | 43 00 933 C1 | 5/1994 |
| DE | 195 33 912 A1 | 3/1997 |
| DE | 196 28 212 A1 | 1/1998 |
| DE | 197 23 796 | 12/1998 |
| DE | 198 04 522 | 2/1999 |
| DE | 198 29 916 A1 | 1/2000 |
| DE | 102 18 380 A1 | 11/2003 |
| DE | 102 22 915 A1 | 1/2004 |
| DE | 102 41 004 A1 | 3/2004 |
| DE | 102 42 081 A1 | 3/2004 |
| DE | 103 25 779 A1 | 1/2005 |
| EP | 0 335 240 A2 | 3/1989 |
| EP | 0 353 467 A1 | 2/1990 |
| EP | 0 571 664 | 12/1993 |
| EP | 0 677 320 | 10/1995 |
| EP | 0 763 589 B1 | 3/1997 |
| EP | 0 824 973 A2 | 2/1998 |
| EP | 0 910 472 B1 | 4/1999 |
| EP | 19990936166 | 7/1999 |
| EP | 1 098 703 | 5/2001 |
| EP | 1 107 824 | 6/2001 |
| EP | 1 797 954 | 6/2007 |
| EP | 1 833 606 | 9/2007 |
| GB | 1283737 | 8/1972 |
| JP | 56037048 | 4/1981 |
| JP | 58 30345 | 2/1983 |
| JP | 2007-7297248 | 11/2007 |
| WO | WO 95/20434 | 8/1995 |
| WO | WO 98/02248 | 1/1998 |
| WO | WO 98/55230 | 12/1998 |
| WO | WO 00/01483 | 1/2000 |
| WO | WO 00/12211 | 3/2000 |
| WO | WO 03/099437 A1 | 12/2003 |
| WO | WO 2004/022226 A1 | 3/2004 |
| WO | WO 2004/026447 A1 | 4/2004 |
| WO | WO 2004/073835 A1 | 9/2004 |
| WO | WO 2004/076067 A1 | 9/2004 |
| WO | WO 2006/072569 | 7/2006 |

OTHER PUBLICATIONS

Wypych, George Knovel Solvents—A Properties Database. Formic Acid. ChemTec Publishing. Online version available at: http://knovel.com/web/portal/browse/display?_EXT_KNOVEL_DISPLAY_bookid=635&VerticalID=0.*

PCT International Search Report.

Abstract of article, Khodayari et al. "Regeneration of commercial Ti-O2-V2O5-WO3 SCR catalyst used in biofuel plants," Applied Catalysis B: Feb. 26, 2001, vol. 30, Issues 1-2, pp. 87-99.

Emissions Control, *SCR Maintenance Fundamentals*, Ken Wicker and Jim Staudt, Power, Jun. 2004, pp. 52-57.

*The Role of Oxalate in Accelerating the Reductive Dissolution of Hematite ($\alpha$-$FE_2O_3$) by Ascorbate*, Steven Banwart, Simon Davies, and Werner Stumm, Colloids and Surfaces, vol. 39, pp. 303-309 (1989).

*Regeneration of Commercial $TiO_2$-$V_2O_5$-$WO_3$ SCR Catalysts Used in Bio Fuel Plants*, Raziyeh Khodayari and C.U. Ingemar Odenbrand, Appliwed Catalysis B. Environmental, vol. 30, pp. 87-99 (2001).

Wypych, George Knovel Solvents—A Properties Database. Acetic Acid. ChemTec Publishing. Copyright 2008. Online version available at http://knvel.com/web/portal/browse/display?_EXT_KNOVEL_DISPLAY_bookid=635&verticalID=0.

Wypych, George Knovel Solvents—A Properties Database. Formic Acid. ChemTec Publishing. Copyright 2008. Online version available at http://knvel.com/web/portal/browse/display?_EXT_KNOVEL_DISPLAY_bookid=635&verticalID=0.

U.S. Appl. No. 11/640,475, filed Dec. 15, 2006, Brüggendick, et al.
U.S. Appl. No. 12/287,347, filed Oct. 8, 2008, Hartenstein, et al.
U.S. Appl. No. 12/287,365, filed Oct. 8, 2008, Hartenstein, et al.
U.S. Appl. No. 12/384,159, filed Apr. 1, 2009, Bruggendick, et al.

* cited by examiner

METHOD OF REGENERATION OF SCR CATALYST

CROSS-REFERENCE TO RELATED APPLICATIONS

This application claims the benefit of U.S. provisional patent application 61/068,989, filed Mar. 11, 2008, herein incorporated by reference.

FIELD OF THE INVENTION

The present invention relates to a method of regeneration of a catalyst, more particularly to a method of regeneration of a selective catalytic reduction (SCR) catalyst.

BACKGROUND OF THE INVENTION

High temperature thermal processes, for example, the generation of steam for the production of electricity in power plants utilizing fossil fuels, often create environmentally harmful by-products. These compounds, specifically nitrous oxides (NOx), have to be removed from the flue gases of the high temperature thermal process before being discharged to the environment. The standard for removing NOx from flue gases is the selective catalytic reduction (SCR) process, where a reducing reagent, typically ammonia, is injected, mixed into the flue gas, and sent through a catalytic reaction chamber where the catalyst facilitates the reduction of NOx with the reducing agent to form elemental nitrogen and water. The catalyst, often referred to as a DeNOx catalyst, aids these reactions and is typically constructed of titanium dioxide containing the oxides of transition metals such as, for example, vanadium, molybdenum, and tungsten to act as catalytically active components. The catalyst is arranged on plates, in a honeycomb fashion or as a corrugated structure and placed parallel to the direction of flue gas flow. However, during operation, the catalyst undergoes a loss of activity and efficiency as a result of plugging with ash and deactivation of the active components from certain compounds contained in flue gas which are poisonous to the catalyst. Among these are, for example, sodium (Na), potassium (K), arsenic (As), phosphorous (P) and many others.

It is generally known in the regeneration of SCR catalysts, that inorganic acids may be used to clean and restore a catalyst such as in a soaking step and a neutralization step. Typically, inorganic acids such as sulfuric acid ($H_2SO_4$) and hydrochloric acid (HCl) are commonly used inorganic acids in such steps. Sulfuric acid is relatively inexpensive and readily available. Inorganic acids are typically odorless which is another reason why they are commonly used. $H_2SO_4$ is also used due to the fact that $SO_2$ and $SO_3$ is present in the flue gas and collected by the catalyst during operation in a power plant facility and when a catalyst is submerged in an aqueous solution such as water, it is removed from the catalyst forming a diluted sulfuric acid. Thus, it is already present in the catalyst and new contaminants via other acids are not being introduced into the catalyst. However, the known methods are also disadvantageous because diluted $H_2SO_4$ also corrodes the steel casings of the catalyst. This provides water soluble iron substances which can penetrate in the inside of the pores of a SCR-catalyst. These iron ions are probably the main cause of enhancing some of the undesired side reactions during regular SCR operations in a power plant. During the most undesired of these side reactions, the contents of $SO_2$ in the flue gas can be partially oxidized to $SO_3$, which reacts with water ($H_2O$) in the flue gas to produce $H_2SO_4$. Corrosion of all steel surfaces at temperatures below the $H_2SO_4$ dew point is a problem for all equipment downstream of the catalyst. Furthermore, the possible emission of visible $H_2SO_4$ aerosol particles into the atmosphere may not be desirable.

Thus, there is a need for an alternative method of regeneration of SCR catalyst that provides the optimum performance of the catalyst yet minimizes or reduces the amount of $SO_2$ oxidized to $SO_3$ in a power plant. Of particular importance is the composition of the regeneration solution during the neutralization stage of the regeneration process.

SUMMARY OF THE INVENTION

The present invention provides for a method of regeneration of a SCR catalyst for use in high temperature processes such as a power plant facility burning fossil fuels, bio-based fuels, or a combination thereof, wherein poisons are removed from the catalyst. The method is suitable for use during the regeneration process, particularly the neutralization step using $C_1$ to $C_8$ carboxylic acids.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

For a more complete understanding of this invention reference should now be had to the preferred embodiments illustrated in greater detail in the accompanying drawings and described below. In the drawings, which are not necessarily to scale.

DETAILED DESCRIPTION OF THE INVENTION

Figure 1:
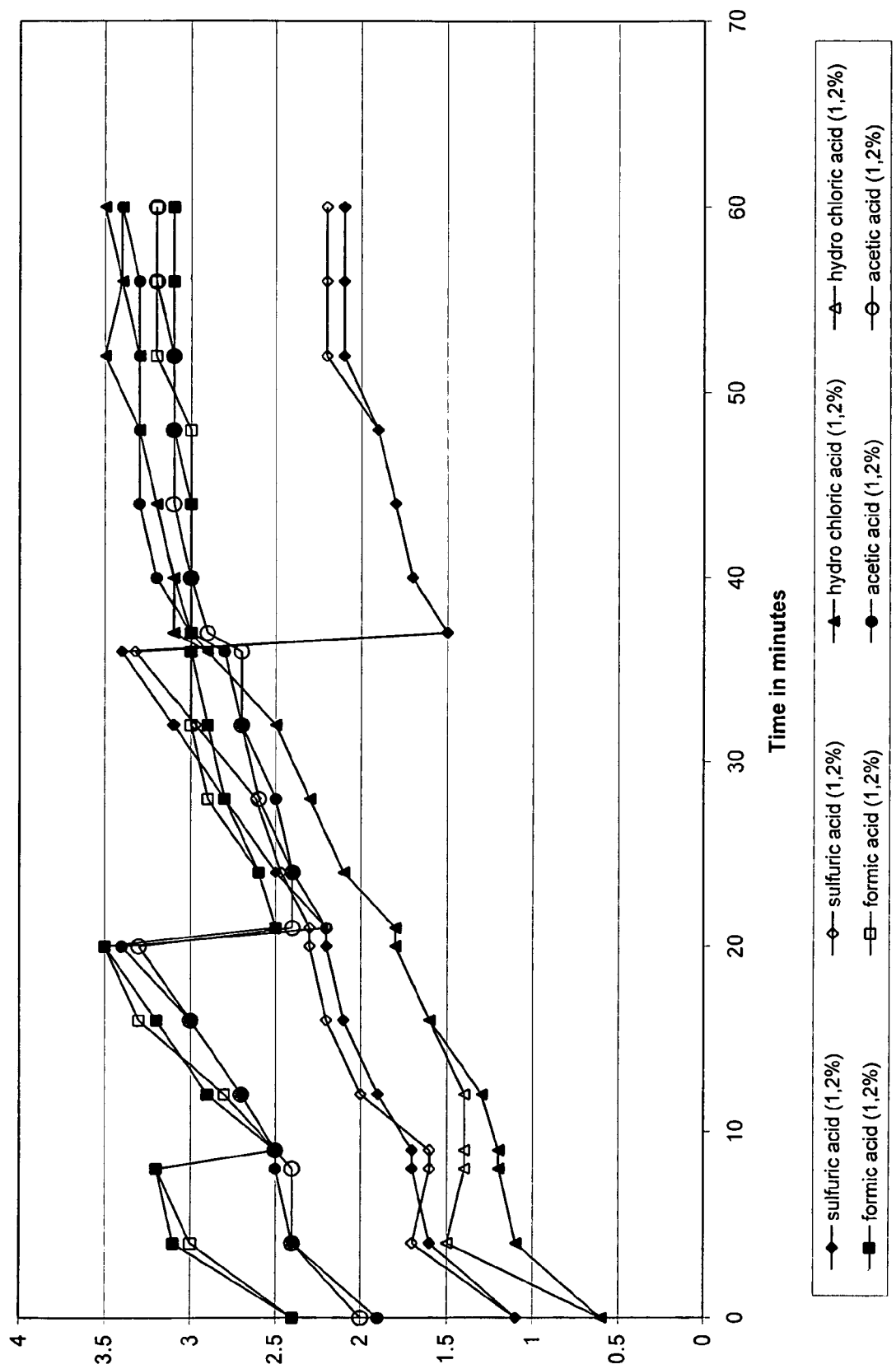
FIG. 1 is a graphical illustration of the data shown in Table 1 of Example 1.

The following detailed description of the invention is merely exemplary in nature and is in no way intended to limit the invention, its application, or uses.

An advantage of the method of the present invention is that the de-nitrogenation performance of a catalyst can be regained with the method of the present invention to a level that can approximate or achieve the activity of a new catalyst. In the method of SCR catalyst cleaning and regeneration of the present invention, elimination of catalyst poisons occurs in conjunction with a re-impregnation of active components onto the catalyst to regain maximum catalytic performance. The method of the present invention is particularly suitable for the removal of catalyst poisons from a SCR catalyst in order the regain the lost activity of the catalyst. Furthermore, the method of the present invention achieves maximum regeneration performance by identifying the optimum choice of treatment solution and treatment parameters particularly suitable for neutralization in the catalyst regeneration process. For example, the method of the present invention provides for the necessary removal of excess alkali material from the catalyst while reducing the amount of corrosion products entering the solution from the catalyst's steel casings.

The method of the present invention comprises removing a catalyst from a power plant facility. The power plant facility may burn fuel that includes, but is not limited to, fossil-fuel, bio-based fuel, or a combination thereof. The catalyst is analyzed, for example, by composition and for contaminant type and level. The catalyst may be of any shape or size including, but not limited to, honeycomb shaped, plate-type, and corrugated-type. Power plant facilities utilize varying sources of fuel with differing qualities and origins, all of which alters the extent and speed of catalyst deactivation.

In the method of the present invention, the catalyst is dry cleaned. A dry cleaning is typically conducted without water by physical means to remove physical contaminants such as dust and fly ash before the catalyst is chemically cleaned or washed and reactivated. Physical means include, but are not limited to, vacuum, brush, shaking, scraping, and disassembling the catalyst casings, i.e. to separate trapped fly ash. Disassembling the catalyst casings relates to a particular type of catalyst comprised of multiple boxes. For this type of catalyst, the boxes are typically removed from the casing's frame in order to be dry pre-cleaned. A catalyst that is laden with dust and fly ash creates a physical hindrance to the reactions that are to take place to clean the flue gas. The fly ash is typically cleared by compressed air, industrial vacuum cleaners, or simply gravity.

After dry pre-cleaning, the catalyst is optionally wet pre-washed. Wet pre-washing refers to washing of the catalyst by a hose or pressure washer, for example. The water used for wet pre-washing includes, but is not limited to, recycled water, city water, process water, well water, and deionized water. Salt layers can also form a barrier in addition to fly ash, and salts are typically removed by wet pre-washing.

After dry pre-cleaning and/or wet pre-washing, the catalyst is chemically cleaned. The chemical cleaning of the catalyst typically occurs by immersing the catalyst in a soaking bath and optionally an ultrasonic treatment.

The catalyst is placed in a soaking bath for soaking and washing of the catalyst or a combination thereof. The soaking bath is typically housed in a tank with optionally being blown through the catalyst during the soaking. The soaking bath comprises an aqueous solution of inorganic bases, inorganic acids, or a combination thereof. Elimination of catalyst poisoning contaminants is preferably achieved by a moderately strong base or moderately strong acid. Inorganic bases are used in a pH range of above about 10, preferably from about 11 to about 14 and acid in the pH range of up to about 6, preferably from about 1 to about 6. The aqueous solution comprises water of the type which includes, but is not limited to, recycled water, city water, process water, well water, and deionized water. The soaking bath may optionally comprise other chemical additives including, but not limited to, surface active substances. The time period for the soaking bath is at least thirty minutes. Preferably, the time period for the soaking bath is from about 3 to 6 hours although there is no limit on the maximum time period for the soaking bath in accordance with the present invention. During the soaking bath, chemicals and water may be added to replace any water that is removed and sent, for example, to a wastewater system.

After the soaking bath, the catalyst is optionally placed or submerged into a tank where it is subjected to an ultrasonic treatment. The ultrasonic treatment tank comprises water and a base, acid, or combination thereof. One or more catalysts can be treated at the same time. Ultrasonic transducers are placed around the catalyst, for example, on top of the catalyst and another on the bottom of the catalyst. Each of the catalysts is ultrasonically treated simultaneously, for example, from the top and the bottom for a certain period of time such as, for example, 30 to 45 minutes although longer or shorter periods of time are in accordance with the method of the present invention. The treatment solution may be circulated and/or replaced during the course of treatment.

Following the soaking bath and/or ultrasonic treatment in a basic solution, the method of the present invention comprises treating the catalyst in an acidic solution referred to as neutralization. Among the purposes of the acid treatment is to remove excess base or alkali solution and activate the reaction centers of the catalyst. The acids to be used may be organic or inorganic. Preferably, the acid is an organic acid. More preferably, the organic acid is a $C_1$ to $C_8$ carboxylic acid. More preferably, the organic acid is selected from the group consisting of formic acid, acetic acid, and a combination thereof. The acid is present in a concentration range of from about 0.1% to about 3%. Preferably, the pH of the aqueous solution is in the range of up to about 5.5, preferably from about 1 to about 5.5, more preferably about 2 to about 3.5. The neutralization treatment is at a temperature in the range of up to about 176° F. (80° C.), preferably from about 60° F. to about 140° F. The time period for neutralization is up to about four (4) hours, preferably in the range of from about thirty (30) minutes to about four (4) hours. Neutralization can take place in one or two steps, where the second step offers an increased concentration gradient. After neutralization, the catalyst is subsequently rinsed and dried.

After the catalyst is rinsed and dried, the catalyst is analyzed to determine the concentration of active components such as any transitional metallic oxides that are comprised in the active sites on the catalyst. A significant loss of active components necessitates the re-impregnation of the catalyst by treating the catalyst in an aqueous solution comprising water and organic substances with various concentrations of metal compounds. The catalyst is subsequently dried to prepare the catalyst for service.

The method of the present invention is advantageous because the use of a $C_1$ to $C_8$ carboxylic acid, such as formic acid or acetic acid, provides for an effective neutralization treatment time that is at least about two (2) times faster than with an inorganic acid. Another advantage is the fact that $C_1$ to $C_8$ carboxylic acids decompose or burn in a drying process and, therefore, it is not necessary to have a rinsing step after neutralization. Another advantage of the method of the present invention is that the mobilization of iron ions out of metal casings such as steel is expected to be reduced by about 30 to 50% for a comparable pH range. This is expected to avoid an unwanted increase of the $SO_2/SO_3$ conversion rate of the catalyst and improve the performance of the catalyst.

The present invention may be better understood by reference to the following non-limiting examples, set forth below.

Example 1

An experiment was conducted to determine the neutralization rate for various acids. Each acid was tested at a concentration of 1.2%. A log of a honeycomb SCR catalyst was cut into sample sizes of 2 inches×2 inches, which had weights between 50.2 g to 52.1 g. Each sample was treated by soaking and ultrasonic treatment for thirty (30) minutes in an ultrasonic bath at a temperature of 40° C. in a solution having a concentration of 1.2% sodium hydroxide (200 mL). The sample was then removed from the ultrasonic bath and subjected to neutralization in 200 mL of each acid with continuous mixing (magnetic stir) at a temperature of 24° C. Acid was added as needed to keep the respective acid solution in a pH range of between 2.5 and 3.5 so as to keep the pH near the starting concentration level of the acid. For example, as shown in Table 1, after twenty (20) minutes, formic acid reached a pH of 3.5 and additional formic acid was added to reduce the pH to 2.5 in run 1. The neutralization was considered finished when there was a constant pH value for at least two or three measurements. The results of the experiment are set forth in Table 1 and the results are shown graphically in FIG. 1.

TABLE 1

| Time (min) | pH of sulfuric acid run 1 | pH of sulfuric acid run 2 | pH of hydrochloric acid run 1 | pH of hydrochloric acid run 2 | pH of formic acid run 1 | pH of formic acid run 2 | pH of acetic acid run 1 | pH of acetic acid run 2 |
|---|---|---|---|---|---|---|---|---|
| 0  | 1.1 | 1.1 | 0.6 | 0.6 | 2.4 | 2.4 | 1.9 | 2.0 |
| 4  | 1.6 | 1.7 | 1.1 | 1.5 | 3.1 | 3.0 | 2.4 | 2.4 |
| 8  | 1.7 | 1.6 | 1.2 | 1.4 | 3.2 | 3.2 | 2.5 | 2.4 |
| 9  | 1.7 | 1.6 | 1.2 | 1.4 | 2.5 | 2.5 | 2.5 | 2.5 |
| 12 | 1.9 | 2.0 | 1.3 | 1.4 | 2.9 | 2.8 | 2.7 | 2.7 |
| 16 | 2.1 | 2.2 | 1.6 | 1.6 | 3.2 | 3.3 | 3.0 | 3.0 |
| 20 | 2.2 | 2.3 | 1.8 | 1.8 | 3.5 | 3.5 | 3.4 | 3.3 |
| 21 | 2.2 | 2.3 | 1.8 | 1.8 | 2.5 | 2.5 | 2.2 | 2.4 |
| 24 | 2.5 | 2.5 | 2.1 | 2.1 | 2.6 | 2.6 | 2.4 | 2.4 |
| 28 | 2.8 | 2.6 | 2.3 | 2.3 | 2.8 | 2.9 | 2.5 | 2.6 |
| 32 | 3.1 | 3.0 | 2.5 | 2.5 | 2.9 | 3.0 | 2.7 | 2.7 |
| 36 | 3.4 | 3.3 | 2.9 | 2.9 | 3.0 | 3.0 | 2.8 | 2.7 |
| 37 | 1.5 | 1.5 | 3.1 | 3.0 | 3.0 | 3.0 | 3.0 | 2.9 |
| 40 | 1.7 | 1.7 | 3.1 | 3.1 | 3.0 | 3.0 | 3.2 | 3.0 |
| 44 | 1.8 | 1.8 | 3.2 | 3.2 | 3.0 | 3.0 | 3.3 | 3.1 |
| 48 | 1.9 | 1.9 | 3.3 | 3.3 | 3.1 | 3.0 | 3.3 | 3.1 |
| 52 | 2.1 | 2.2 | 3.5 | 3.3 | 3.1 | 3.2 | 3.3 | 3.1 |
| 56 | 2.1 | 2.2 | 3.4 | 3.4 | 3.1 | 3.2 | 3.3 | 3.2 |
| 60 | 2.1 | 2.2 | 3.5 | 3.4 | 3.1 | 3.2 | 3.4 | 3.2 |

It was observed from the data in Table 1 that the neutralization with formic acid was finished in 32 minutes, the neutralization with hydrochloric acid was finished in 37 minutes, the neutralization with acetic acid was finished in 44 minutes, and the neutralization with sulfuric acid was finished in 56 minutes. It was observed from the data in Table 1 that the neutralization rate with formic acid was nearly twice as fast as compared to the neutralization rate with the sulfuric acid. It was also observed from the data in Table 1 that the neutralization rate with acetic acid was faster as compared to the neutralization rate with the inorganic acids.

Example 2

An experiment was conducted to determine the iron mobilization rate for various acids. In particular, three organic acids and two inorganic acids were tested. A 100 g iron plate (not corroded) was placed in 500 mL of deionized water. Acid was added to obtain solutions with the acid concentrations and pH shown in Table 2. The pH of the solution was measured with a pH meter and the concentration of iron in the acid solution was measured in mg/L at different periods in time. The Fe(2+) concentration of each solution was measured using the MERCKOQUANT™ Eisen-Test 500 mg/L Fe(II) mg/l (nr. 1.10004.0001) from VWR International of Germany. Additional deionized water was added to a test solution when needed to maintain the concentration of the test solution at 500 mg/L in order to be within the test parameters of the above mentioned test. Due to iron corrosion, ascorbic acid was added to solutions as needed to reduce Fe(+3) to Fe(+2) for acids that oxidize the iron to maintain test parameters. The temperature of each solution was 20° C. The resulting data is shown in Table 2.

TABLE 2

| Acid | Acid Conc. | pH | Fe (2+) in mg/L after 30 minutes | Fe (2+) in mg/L after 60 minutes | Fe (2+) in mg/L after 90 minutes | Fe (2+) in mg/L after 120 minutes | Fe (2+) in mg/L after 240 minutes |
|---|---|---|---|---|---|---|---|
| formic | 0.5% | 3.1 | 5 | 10 | 10 | 10 | 20 |
| formic | 1.0% | 2.9 | 10 | 20 | 20 | 20 | 20 |
| formic | 1.5% | 2.8 | 20 | 50 | 50 | 50 | 50 |
| formic | 2.0% | 2.7 | 20 | 50 | 50 | 80 | 100 |
| formic | 5.0% | 2.5 | 50 | 50 | 100 | 120 | 160 |
| acetic | 0.5% | — | 10 | 10 | 10 | 20 | 20 |
| acetic | 1.0% | — | 10 | 10 | 10 | 20 | 20 |
| acetic | 1.5% | — | 20 | 20 | 20 | 20 | 30 |
| acetic | 2.0% | — | 20 | 20 | 20 | 20 | 40 |
| acetic | 5.0% | — | 20 | 20 | 20 | 20 | 40 |
| oxalic | 0.5% | — | — | — | — | — | — |
| oxalic | 1.0% | — | 150 | 200 | 300 | 500 | 500 |
| oxalic | 1.5% | — | — | — | — | — | — |
| oxalic | 2.0% | — | — | — | — | — | — |
| oxalic | 5.0% | — | 250 | 500 | 1000 | 1000 | 1000 |
| sulfuric | 0.5% | 2.8 | — | — | — | — | — |
| sulfuric | 1.0% | 2.0 | 150 | 200 | 300 | 500 | 500 |
| sulfuric | 1.5% | 1.6 | — | — | — | — | — |
| sulfuric | 2.0% | . | — | — | — | — | — |
| sulfuric | 5.0% | — | 250 | 500 | 1000 | — | — |
| nitric | 0.5% | — | — | — | — | — | — |
| nitric | 1.0% | — | 150 | 200 | 300 | 500 | 500 |
| nitric | 1.5% | — | — | — | — | — | — |
| nitric | 2.0% | — | — | — | — | — | — |
| nitric | 5.0% | — | 250 | 500 | 1000 | — | — |

Note that the dashes in the table indicate no tests were performed as the amount of iron mobilized already exceeded the maximum iron ion concentration achieved in 1% carboxylic acid.

It was observed from the data in Table 2 that the performance of the organic acids was best, namely the acetic acid and formic acid. It was observed that a concentration range from 0.5% to 1.5% of both acetic acid and formic acid reacted nearly identically. It was also observed from the data in Table 2 that the mobilization of iron in the case of inorganic acids was between 5 and 8 times higher than the organic acids.

It will therefore be readily understood by those persons skilled in the art that the present invention is suitable for broad utility and application and not limited to the utility industry. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method of regenerating a SCR catalyst, the method comprising:
    treating a used catalyst with a basic solution, and
    treating the basic solution remaining in the used catalyst with an organic acid at a pH in a range of up to about 5.5 for a time period of up to about four hours to effect neutralization of the basic solution remaining in the used catalyst after the treatment of the used catalyst with the basic solution.

2. The method according to claim 1, wherein the pH is in a range of from about 1 to about 5.5.

3. The method according to claim 1, wherein the time period is in a range of from about thirty minutes to about four hours.

4. The method according to claim 1, wherein the organic acid is a $C_1$ to $C_8$ carboxylic acid.

5. The method according to claim 4, wherein the $C_1$ to $C_8$ carboxylic acid is selected from the group consisting of formic acid, acetic acid, and a combination thereof.

6. A method of regenerating a SCR catalyst, the method comprising:
    treating a used catalyst with a basic solution, and
    treating the basic solution remaining in the used catalyst with a $C_1$ to $C_8$ carboxylic acid to effect neutralization of the basic solution remaining in the used catalyst.

7. The method according to claim 6, wherein the $C_1$ to $C_8$ carboxylic acid is selected from the group consisting of formic acid, acetic acid, and a combination thereof.

8. A method of regenerating a SCR catalyst, the method comprising:
    treating a used catalyst with a basic solution, and
    treating the basic solution remaining in the used catalyst with a $C_1$ to $C_8$ carboxylic acid to increase neutralization rate of the basic solution remaining in the used catalyst.

9. The method according to claim 8, wherein the $C_1$ to $C_8$ carboxylic acid is selected from the group consisting of formic acid, acetic acid, and a combination thereof.

10. A method of regenerating a SCR catalyst, the method comprising:
    treating a used catalyst with a basic solution, and
    treating the basic solution remaining in the used catalyst with a $C_1$ to $C_8$ carboxylic acid to reduce mobilization of iron ions in the basic solution remaining in the used catalyst.

11. The method according to claim 10, wherein the $C_1$ to $C_8$ carboxylic acid is selected from the group consisting of formic acid, acetic acid, and a combination thereof.

* * * * *